Patented Oct. 21, 1941

2,259,650

UNITED STATES PATENT OFFICE 2,259,650

CHEMICAL COMPOUND

Robert William Maxwell, Wilmington, Del., assignor to E. I. du Pont de Nemours & Company, Wilmington, Del., a corporation of Delaware No Drawing. Application November 18, 1938, Serial No. 241,145

9 Claims. (Cl. 260—404)

This invention relates to novel chemical compounds. More particularly, this invention deals with novel, water-soluble, chemical compounds which are useful as textile treating agents.

It is an object of this invention to prepare novel water-soluble chemical compounds which are useful in the art of treating textile fibers with aqueous baths. It is a further object of this invention to provide novel chemical compounds which have the property of softening textile fiber and of imparting thereto laundry-fast water-repellent characteristics. Other and further objects of this invention will appear as the description proceeds.

Now, according to this invention, these and other objects are accomplished by reacting together in optional order (1) a hydrogen halide or a reagent capable of supplying a hydrogen halide; (2) a methylol derivative of a long-chain fatty-acid amide, as expressed by the formula R—CONH—CH$_2$OH, wherein R is an alkyl radical containing not less than 8 carbon atoms; and (3) a polytertiary-amine, that is, a compound having at least two tertiary-nitrogenous basic groups in its structure.

As typical illustrations of said poly-tertiary amines may be mentioned tetramethyl-diamino-methane and tetramethyl-diamino-ethane (i. e. N,N,N',N'-tetramethyl-ethylene-diamine.) But compounds containing more than two tertiary groups also come within the scope of this invention, as evident from the more detailed discussion hereinbelow.

As a typical illustration of a methylol derivative of a fatty-acid-amide, may be taken stearamido-methanol (i. e. methylol-stearamide:

C$_{17}$H$_{35}$CONH—CH$_2$OH)

But the methylol derivative of any other fatty acid amide having from 8 to 20 carbon atoms in its structure may be employed. As fatty acids for this purpose come into consideration also mixtures of acids derived from natural fats and oils, such as cocoanut oil, palm oil, cottonseed oil or tallow, as well as the acids obtained from hydrogenated fats.

The reaction between the three principal components may be effected in any one of several optional procedures. For instance, the methylol compound and the poly-tertiary base may be mixed together and hydrogen chloride then fed into the mixture. Or the poly-tertiary base may be reacted with hydrogen chloride to form a salt of the base, and the latter may then be reacted with the chosen methylol compound in an inert solvent, preferably in the presence of a small quantity of the free base. Finally, the methylol compound may first be reacted with thionyl chloride or other halogenating agent to form, what appears to be, the corresponding methylene halide of the probable formula R—CONH—CH$_2$Cl, which is then isolated and reacted with the selected poly-tertiary base in a suitable inert solvent.

The exact constitution of the resulting product in each of the above cases is difficult to state with certainty. With the simpler polytertiary bases, for instance tetramethyl-diamino-ethane, it is probable that a neutral addition compound is formed, at least in part, which may be typified by the following hypothetical equation:

2C$_{17}$H$_{35}$CONH.CH$_2$OH+2HCl+(CH$_3$)$_2$N—CH$_2$CH$_2$—N(CH$_3$)$_2$

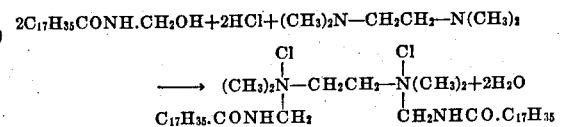

$$\longrightarrow (CH_3)_2\overset{Cl}{\underset{|}{N}}-CH_2CH_2-\overset{Cl}{\underset{|}{N}}(CH_3)_2 + 2H_2O$$

$$C_{17}H_{35}.CONHCH_2 \qquad CH_2NHCO.C_{17}H_{35}$$

In the case of the higher polytertiary compounds, however, there is evidence to believe that some of the tertiary groups may become neutralized with HCl but do not carry the fatty-amido-methylene chain.

The novel compounds of this invention, however, are all characterized by being water-soluble to give foaming solutions which impart a desirable degree of softness to cellulosic textile fabric when treated therewith. When applied to cellulosic textile fiber in the manner described in British Patent No. 477,991, that is by impregnation from aqueous solution, followed by squeezing, drying at low temperature (not above 40° C.), and then baking in the absence of moisture at a temperature between 105 and 130° C. they impart to the fabric the property of shedding water, which effect is more or less of a permanent nature, in the sense that it will outlast laundering, the actual degree of permanence being dependent on the particular agents selected for the synthesis and on the particular mode of synthesis employed. In some instances, for instance in the case of Example 6 below, the product appears to be superior in the above respects to the reagents employed in said British patent, presumably due to a higher degree of solubility.

Without limiting my invention to any particular procedure, the following examples are given to illustrate my preferred mode of operation. Parts mentioned are by weight.

Example 1

A solution containing 4 parts of tetramethyl-diamino-methane in ethylene chloride is mixed with 30 parts of a solution produced by passing hydrogen chloride through a 2% suspension of methylol-stearamide in ethylene chloride until the suspended matter has dissolved. The reaction mixture is then heated on the steam bath for six hours at 70° C. The reaction mass thus obtained is soluble in water, yielding a stable foaming solution which does not lose its foaming powers after standing for 24 hours.

If the above reaction mass is diluted with an equal volume of ethylene chloride, a low-viscosity, dark colored solution is obtained. Unfinished, mercerized, cotton broadcloth impregnated with this solution, then wrung, dried at room temperature and heated at 120° C. for 1 hour, acquires a good degree of water repellency which is not lost after laundering.

If desired, the reaction mass may be evaporated to dryness. The resulting solid, if diluted with 25 times its own weight of water, gives a gelatinous solution which foams on shaking. If mercerized, unfinished, cotton broadcloth is treated with this solution, with or without further dilution of the same with an equal volume of water, then wrung out, dried at room temperature, baked in the absence of moisture for 20 minutes at 100° C., and finally given a light soaping and rinsing, it is found to be water-repellent, and this effect is not lost after laundering.

Example 2

Ten parts of methylol stearamide is mixed with 50 parts of ethylene chloride, after which 8 parts of thionyl chloride is added, and the mixture is allowed to stir for about four hours. The remaining thionyl chloride, as well as the ethylene chloride, is then removed by application of vacuum at room temperature. The residue is mixed with 7.5 parts of a solution of tetramethyl-diaminomethane prepared by mixing a solution of 29 parts of dimethylamine in 100 parts of ethylene chloride with 10 parts of paraformaldehyde, after which the reactants are heated on the steam bath for 24 hours at 70° C. The product gives a fine, soapy, foaming stable solution in water.

The reaction mixture is then evaporated to dryness and may be used as a water repellent without further purification.

Example 3

One part of the reaction product of methylolstearamide with thionyl chloride is dissolved in three parts of ethylene chloride, and mixed with one part of N,N,N',N'-tetramethyl hexamethylenediamine. The mixture is then heated to 75° C. for two hours. The product can be dissolved in water to give a foaming solution.

Example 4

Four parts of N,N,N',N'-tetramethyl-ethylenediamine are added to a solution of 10 parts of the reaction product of thionyl chloride with methylolstearamide dissolved in 50 parts of ethylene chloride. The mixture is then refluxed on the steam bath overnight. The product gives a good forming solution in water, which imparts water-repellency to textile fiber when treated as described in Example 1.

Example 5

Seven parts of N,N,N',N'-tetramethyl-ethylene-diamine-hydrochloride containing a little of the free amine are added to a solution of 10 parts of methylol-stearamide in 60 parts of ethylene chloride, and heated with stirring at 60° C. The product is of good solubility in water and is considerably lighter in color than the product obtained in Example 4. When evaporated to dryness and tested for water-repellent power in accordance with the procedure indicated in Example 1, it gives an excellent, laundry-fast, water-repellent effect.

Example 6

Thirty parts of methylolstearamide are suspended in 300 parts of methyl acetate, and, while stirring, 6 parts of phosphorus trichloride diluted with 15 parts of ethyl acetate are added, keeping the temperature at 22 to 25° C. The reaction mass is then heated up to 42° C. As soon as this temperature is reached it becomes clear. It is immediately cooled down to 25° C. and 11 parts of N,N,N'N'-tetramethylethylenediamine, diluted with 25 parts of methyl acetate, are slowly added, keeping the temperature at 25° C. After all the base is in the reaction mass, it is found neutral to Congo red paper. It is then further heated for 1½ hours at 45° C., cooled down, and the crystalline precipitate is filtered off and dried. Yield 35 parts.

The reaction mass contains 85.2% of bis-stearamidomethyl-tetramethyl-ethylene diammonium chloride and a small amount of a tetramethyl-ethylenediamine salt of phosphorus acid. The material is soluble in water and ethyl alcohol. A water solution is immediately decomposed to insoluble products when alkaline substances are added. A solution of 2% of the product applied in the aforementioned manner on cotton cloth renders it permanently water repellent.

In a similar manner other novel textile assistants within the scope of this invention may be prepared. As polytertiary amines, in lieu of those named in the above examples, may be used N,N,N', N'- tetramethyl - trimethylene - diamine; N,N,N',N'',N''-pentamethyl-diethylene-triamine; N, N'- dimethyl - piperazine; N, N'- dipiperidyl-methane; N,N'-dipiperidyl-ethane; the various isomeric dipyridyls; 1,3-tetramethyl-diamino-2-hydroxy-propane; beta, beta'- tetramethyl-diamino-diethyl-ether; and in general, any other polytertiary amine having at least two tertiary nitrogenous groups, but preferably having no more than 6 carbon atoms for each such nitrogen atom. This limitation is recommended for the reason that the reactivity of the tertiary nitrogenous group seems to drop off as the lengths of the carbon chains attached thereto increase. Otherwise, however, the polytertiary compound may carry substituents such as hydroxyl, halogen, carboxyl and ketone groups.

As alternative methylol-amides for the above reaction may be mentioned those derived from palmitic acid, oleic acid, lauric acid or any other fatty acid of the group hereinabove indicated.

In lieu of hydrogen chloride in the above examples other water-soluble acids may be employed, for instance sulfuric, nitric, formic or acetic. Combinations of the polytertiary-amine with acid forming compounds, for instance sulfur trioxide or acetic anhydride may also be employed, according to the procedure of Example 5 above.

The proportions of the reactants employed may be varied within wide limits, but it is generally preferable to work with an excess of the polytertiary amine.

As for the temperature of the reaction, the preferred temperature will depend somewhat on the method of condensation employed. Temperatures of 25 to 84° C. have been indicated in the above examples. Where a methylolamide is treated with the tertiary amine salt, as in Example 5 above, temperatures of about 60° C. give optimum results, while temperatures much above this figure are to be discouraged. A small excess of free amine is desirable in this reaction, since this seems to catalyze the condensation. But where the methylolamide is first treated with a hydroxyl replacing reagent generating a hydrohalogen acid, such as thionyl chloride, the reaction to form the new derivatives is best carried out at temperatures of around 40° C. or somewhat lower. Also, in this type of reaction it is best that the final step of the reaction be carried out promptly.

The principal characteristic of my novel compounds is their increased solubility as compared to similar compounds derived from the monotertiary amines, as for instance the compounds mentioned in British Patents Nos. 475,170 and 477,991. Their principal practical interest is for the purpose of imparting water-repellency to textile fiber. Their properties are, however, such that they may be used for various other purposes, for instance softening of textile fiber, or as wetting agents, and dyeing assistants. Their dye fixing action, particularly for direct dyestuffs on cotton, is of considerable value, particularly where the amide group from which the addition compound was formed also contains tertiary amino groups.

I claim as my invention:

1. The group of chemical compounds which are obtained by reacting together, at a temperature between 25 and 84° C., a higher-fatty-acid-amido-methylol, an organic polytertiary nitrogenous base and a water-soluble acid, said group of compounds being characterized by solubility in water to give foaming solutions, which solutions in turn impart softness to textile fiber and further impart water repellent characteristics thereto if the fiber is impregnated with said solution, dried at a low temperature and then baked in the absence of moisture at a temperature above 105° C.

2. A chemical compound of the group obtained by reacting together, at a temperature between 25 and 84° C., a methylol compound of the general formula R—CONH—CH₂OH, wherein R is an aliphatic radical having from 8 to 20 carbon atoms, a polytertiary organic nitrogenous base wherein the number of carbon atoms does not exceed 6 for each nitrogenous basic group, and a hydrogen-halide yielding substance; said compound being a solid, soluble in water to give a foaming solution, and further characterized by imparting water-repellent characteristics to cellulosic textile fiber when the latter is impregnated with a solution thereof, dried at a temperature not above 40° C. and then baked in the absence of moisture at a temperature above 105° C.

3. A compound of the general formula

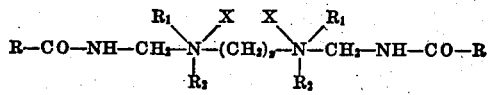

wherein R stands for an aliphatic radical having from 8 to 20 carbon atoms, R₁ and R₂ are lower alkyl radicals, X is the anion of a water-soluble acid, while y stands for an integer not greater than 6.

4. A textile-treatment agent of the general formula

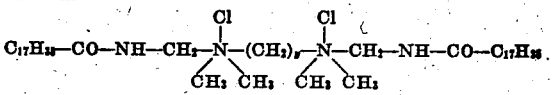

wherein y stands for an integer not greater than 6, said product being characterized by imparting water-repellent characteristics to cellulosic textile fiber when the latter is impregnated with a solution thereof, dried at a temperature not above 40° C. and then baked in the absence of moisture at a temperature above 105° C.

5. The compound, bis-stearamidomethyl-tetramethyl-ethylene-diammonium chloride.

6. The process of producing water-soluble organic compounds, useful as treating agents for textile fiber, which comprises subjecting to mutual interaction, at a temperature between about 25 and 84° C., a higher-fatty-acid-amidomethylol, an organic polytertiary nitrogenous base, and a water-soluble acid.

7. The process of producing water-soluble organic compounds, useful as treating agents for textile fiber, which comprises reacting, at substantially room temperature, a methylol compound of the general formula

wherein R is an aliphatic radical having from 8 to 20 carbon atoms, with a reagent adapted to supply hydrogen halide, and then further reacting the intermediate compound thus obtained, at a temperature not exceeding 84° C., with a polytertiary nitrogenous organic base having not more than 6 carbon atoms for each nitrogenous basic group.

8. The process of producing water-soluble compounds, useful as treating agents for textile fiber, which comprises reacting stearamidomethylol with a reagent adapted to furnish a hydrogen halide upon reaction with a compound containing hydroxyl groups, and then further reacting the intermediate compound thus obtained with a compound of the general formula

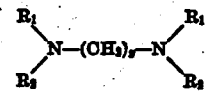

wherein R₁ and R₂ are lower alkyl radicals, while y is an integer not greater than 6.

9. The process of producing water-soluble organic compounds, useful as treating agents for textile fiber, which comprises reacting stearamido methylol with phosphorus trichloride in an inert organic solvent, and then further reacting the reaction mass thus obtained with tetramethyl-ethylene-diamine in the presence of an inert solvent, and recovering the solid reaction product.

ROBERT WILLIAM MAXWELL.